United States Patent
Han et al.

(10) Patent No.: US 8,149,933 B2
(45) Date of Patent: Apr. 3, 2012

(54) METHOD AND APPARATUS FOR SUBCHANNEL ASSIGNMENT FOR SUPPRESSING INTERANTENNA INTERFERENCE IN OFDMA SYSTEM

(75) Inventors: Shuangfeng Han, Suwon-si (KR); Seong-Taek Hwang, Pyeongtaek-si (KR); Zhunhui Zhou, Beijing (CN); Jing Wang, Beijing (CN); Ming Zhao, Beijing (CN); Zheng Xu, Beijing (CN)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 731 days.

(21) Appl. No.: 12/040,023

(22) Filed: Feb. 29, 2008

(65) Prior Publication Data

US 2008/0212703 A1 Sep. 4, 2008

(30) Foreign Application Priority Data

Mar. 2, 2007 (KR) ........................ 10-2007-0020985

(51) Int. Cl.
*H04K 1/10* (2006.01)
(52) U.S. Cl. ........ 375/260; 375/259; 375/295; 375/316; 375/267; 375/347; 375/299; 370/334; 370/332; 370/312; 370/208

(58) Field of Classification Search .................. 375/260, 375/259, 295, 316, 267, 257, 347, 299; 455/561, 455/424, 425; 370/334, 332, 312, 208
See application file for complete search history.

(56) References Cited

U.S. PATENT DOCUMENTS

| | | | |
|---|---|---|---|
| 2005/0085235 A1 | 4/2005 | Park et al. | |
| 2006/0120395 A1* | 6/2006 | Xing et al. | 370/431 |
| 2006/0276227 A1* | 12/2006 | Dravida | 455/562.1 |

FOREIGN PATENT DOCUMENTS

| | | |
|---|---|---|
| KR | 2000-39420 | 7/2000 |
| KR | 2003-22907 | 3/2003 |

* cited by examiner

*Primary Examiner* — David C. Payne
*Assistant Examiner* — Zewdu Kassa
(74) *Attorney, Agent, or Firm* — Cha & Reiter, LLC (57) ABSTRACT

Disclosed is a method and an apparatus for subchannel assignment for suppressing inter-antenna interference in an Orthogonal Frequency Division Multiplexing Access (OFDMA) system based distributed wireless communication system equipped with antennas that are randomly distributed in a geographical manner and can simultaneously communicate with multiple Subscriber Stations (SSs). The method includes selecting and obtaining access to distributed antennas which satisfy the data transmission rate that an SS requires and with which the SS can communicate; re-queuing a distributed antenna having the maximum transmitted power within the same cell in high priority; and assigning subchannels to the relevant distributed antennas in an order from the relevant distributed antenna having the high priority.

15 Claims, 3 Drawing Sheets

METHOD AND APPARATUS FOR SUBCHANNEL ASSIGNMENT FOR SUPPRESSING INTERANTENNA INTERFERENCE IN OFDMA SYSTEM

CLAIM OF PRIORITY

This application claims the benefit of the earlier filing date, under 35 U.S.C. §119(a), to that patent application entitled "Method and Apparatus for Subchannel Assignment for Suppressing Interantenna Interference in OFDMA System," filed in the Korean Intellectual Property Office on Mar. 2, 2007 and assigned Serial No. 2007-20985, the contents of which are hereby incorporated by reference.

BACKGROUND OF THE INVENTION

1. Field of the Invention

The present invention relates to Orthogonal Frequency Division Multiplexing Access (OFDMA) communication systems, and more particularly to a method and an apparatus for subchannel assignment for suppressing and minimizing inter-antenna interference in an OFDMA system.

2. Description of the Related Art

With an increase of the requirements of a user in relation to internet service, the need for a communication system that can efficiently offer internet service is increasing. The existing communication network has been developed for the main purpose of a voice service but has drawbacks in that the existing communication systems have a relatively narrow data transmission band width, and require an expensive charge for its usage.

In order to resolve or correct such drawbacks, a study on a scheme of OFDM is being conducted as a representative example of a broadband wireless access scheme.

The scheme of OFDM corresponds to a typical transmission scheme employing multi-carriers and to a scheme that converts a symbol queue input in series into parallel data, modulates a converted symbol queue through multiple subcarriers having mutual orthogonality, and then transmit a modulated symbol queue. The above-mentioned scheme of OFDM can be widely applied to digital transmission technology that needs high-speed data transmission, such as wireless internet, Digital Audio Broadcasting (DAB) and digital television, Wireless Local Area Network (WLAN), and the like.

The scheme of OFDM (see for example, L. J. Cimini, "Analysis and Simulation of a Digital Mobile Channel Using Orthogonal Frequency Division Multiplexing," IEEE Trans. Commn., vol. COM-33, no. 7, pp. 665-675, June 1985 and Richard Van Nee and Ramjee Prasad, "OFDM for Wireless Multimedia Communications," Artech House, 2000.) corresponds to multiplexing technology that subordinately divides a bandwidth into multiple frequency subcarriers.

In OFDM, an input data stream is divided into several parallel substreams having a reduced data rate (therefore, the symbol length increases). Then, each substream is modulated, and is transmitted, on a separate orthogonal subcarrier. An increase of the symbol length improves the robustness of the OFDM against delay diffusion. OFDM modulation can be realized by efficient Inverse Fast Fourier Transforms (IFFT), which in turn enables multiple subcarriers having low complexity.

In the above OFDM system, channel resources employ an OFDM symbol in the time domain, and is enabled by using subcarriers in the frequency domain. Time and frequency resources consist of subchannels assigned to an individual user.

Also, the scheme of OFDM corresponds to a scheme of multiaccess/multiplexing, provides a multiplexing operation relating to data streams from multiuser to Up Link (UL) multiaccess employing a Down Link (DL) subchannel and an UL subchannel.

As previously described, the subcarrier is usually grouped into subsets called subchannels. For example, in a World interoperability for Microwave Access (WiMAX) system, the structure of OFDM symbol is made up of three kinds of subcarriers, including a data subcarrier for data transmission, a pilot subcarrier for an evaluation and synchronization, and a null subcarrier for a guard band and a DC carrier. An activated (data and pilot) subcarrier is grouped into subchannels.

A WiMAX OFDM physical layer (see for example, IEEE 802. 16-2004 (Revision of IEEE Std 802. 16-2001), "IEEE Standard for Local and Metropolitan Area Networks—Part 16: Air Interface for Fixed Broadband Wireless Access Systems," October 2004 and IEEE 802. 16e-2005, "IEEE Standard for Local and Metropolitan Area Networks—Part 16: Air Interface for Fixed and Mobile Broadband Wireless Access Systems," February 2006) supports subchannelization both in a DL (downlink) and in an UL (uplink), and a unit of the minimum frequency/time resources of the subchannelization corresponds to one slot.

Hence, research on an algorithm for assigning an adaptive subcarrier (subchannel) has been extensively carried out in a multi-user OFDM system. However, most of these algorithms are based on a Central Antenna based System (CAS).

A Distributed Antenna System (DAS) that is based on the OFDMA can allow a subcarrier to be used by another antenna.

In general, a DAS (see for example, A. M. Adel, A. Saleh, A. J. Rustako, and R. S. Ramon, "Distributed Antennas for Indoor Radio Communications," IEEE Trans. Commun., vol. 35, pp. 1245-1251, December 1987 and S. Zhou, M. Xhao, X. Xu, J. Wang, and Y. Yao, "Distributed Wireless Communications System: a New Architecture for Future Public Wireless Access," IEEE Commun. Mag., vol. 17, no. 3, pp. 108-113, March 2003) can provide macro-diversity that controls a large-scale fading and reduces an access distance by distributing antennas geometrically. The DAS has been introduced so as to solve a coverage area problem in an indoor wireless system, and afterwards has been applied to the performance improvement of a Code Division Multiple Access (CDMA) system.

Figure 1:
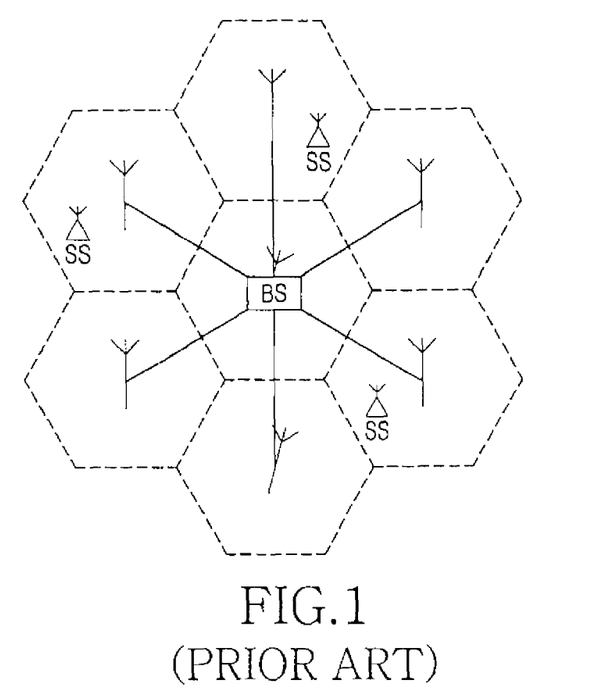
FIG. 1 is a view illustrating a coverage area by each of a plurality of distributed antenna of a Base Station (BS) centered in a general DAS.

FIG. 1 is a view illustrating a coverage area by each distributed antenna that is distributed around a Base Station (BS) centered in a DAS. With reference to FIG. 1, in the DAS, the antennas of the BS are uniformly distributed geometrically, and with each antenna of the BS as the center of a hexagon area, an overall area can be divided into six hexagonal subareas. If an average access distance decreases in the DAS, as transmission power is reduced, inter-antenna interference diminishes, and capacity can increase. Channel conditions of the antennas of the BS are measured and analyzed by a subscriber station (SS) in each frame, and then an antenna M having the maximum gain can be selected as a serving antenna in the next frame. The value of M is equal to or greater than '1.' Herein, the value of M is confined to being '1' to have a positive value.

If the number of antennas equals 'P' within a cell of the DAS, the number of developed subcarriers becomes P times as many as a CAS. Thus, an assignment of resources developed more complicated in the DAS.

At present, in the DAS based on the OFDMA, an algorithm for assigning subchannels can be classified into several kinds as in the following.

1. Each antenna develops all subchannels.
2. All subchannels are assigned to cells only once. This implies that if any subchannel is used by one antenna in a cell, the subchannel cannot be employed even by any other antenna within the cell.
3. Each subchannel is assigned from a global viewpoint, and in order to obtain diversity gain, it is allowed for two adjacent antennas to use one SS through the same subchannel.

However, if each antenna develops all subchannels as described above, this is the same as cell division from a standpoint of frequency reuse, and incurs inter-antenna interference similar to co-channel interference in the cell division. Also, if all subchannels are developed by one remote antenna and one SS, even though interference is excluded from another antenna, this is a waste of bandwidth, and problems arise, for example in hot-zones.

Hence, at present, even though two antennas are sufficiently far away from each other in the OFDMA-based DAS, its subchannels cannot be reused.

In this manner, if each antenna develops all subchannels, this is the same as cell division from a viewpoint of frequency reuse, and causes such problem that a serious inter-antenna interference similar to co-channel interference is incurred.

SUMMARY OF THE INVENTION

Accordingly, the present invention provides a method and an apparatus for subchannel assignment for suppressing inter-antenna interference in an OFDMA system, by assigning subchannels different from one another to antennas adjacent to one another, which in turn minimizes inter-antenna interference and satisfies the transmission rate required by a user.

In accordance with an aspect of the present invention, there is provided a method for subchannel assignment for suppressing inter-antenna interference in an Orthogonal Frequency Division Multiplexing Access (OFDMA) system-based distributed wireless communication system equipped with distributed antennas that are randomly distributed in a geographical manner and can simultaneously communicate multiple to Subscriber Stations (SSs), including the steps of selecting and obtaining access to distributed antennas which satisfy the data transmission rate that an SS requires and with which the SS can communicate, re-queuing a distributed antenna having the maximum transmitted power within the same cell a highest priority, and assigning subchannels to the relevant distributed antennas in order from the relevant distributed antenna having the highest priority.

In accordance with another aspect of the present invention, there is provided an apparatus for subchannel assignment for suppressing inter-antenna interference in an Orthogonal Frequency Division Multiplexing Access (OFDMA) system-based distributed wireless communication system having a Base Station (BS) apparatus for subchannel assignment, including a first assigning unit for finding a subchannel used by a distributed antenna adjacent to a relevant distributed antenna assigned another subchannel; and a second assigning unit for specifying a high priority for a distributed antenna having a maximum transmitted power and assigning subchannels to the relevant distributed antennas in an order from the relevant distributed antenna having the high priority.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Exemplary embodiments of the present invention are now described in detail with reference to the accompanying drawings. The description includes particulars, such as specific configuration elements, that are presented in support of more comprehensive understanding of the present invention, and it will be obvious to those of ordinary skill in the art that changes in form and modifications may be made to the particulars and are considered to be within the scope of the present invention.

Figure 2:
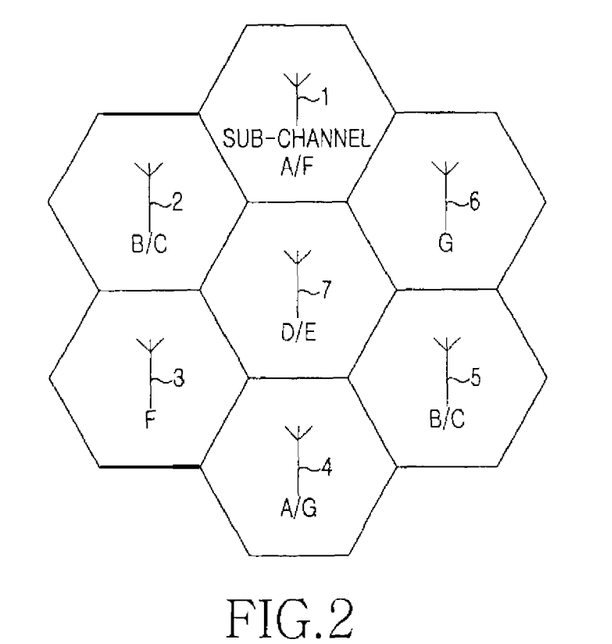
FIG. 2 is a view illustrating a method for assigning a subchannel which avoids adjacent antennas using the same subchannel in an OFDMA system according to an embodiment of the present invention.

FIG. 2 is a view illustrating a method for assigning a subchannel to adjacent antennas while avoiding using the same subchannel in an OFDMA system according to an embodiment of the present invention.

With reference to FIG. 2, if a subchannel A is used by an antenna 1 offering services to an SS within a coverage area of the antenna 1, adjacent antennas 2, 6, and 7 avoid using the assigned subchannel A. The antennas 2, 6, and 7 may employ any of the other subchannels except for the subchannel A. Herein, since an antenna 4 is not adjacent to the antenna 1, the antenna 4 can use subchannel A, and thus there exists a minimal amount of interference between signals transmitted by antenna 4 and antenna 1.

The present invention according to a configuration described above avoids inter-antenna interference due to an assignment of the same subchannel and can achieve optimal use of channel resources, while satisfying the needs in services of an SS of a user.

Figure 3:
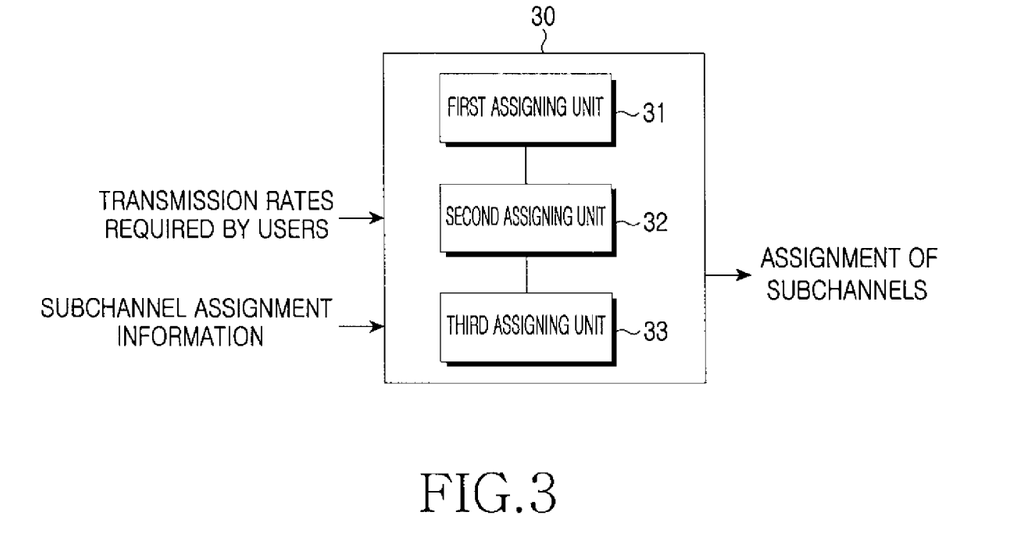
FIG. 3 is a configuration block diagram illustrating a part of an overall internal configuration of a BS in which the assignment of subchannels is performed during a DL of an OFDMA system according to an embodiment of the present invention.

FIG. 3 is a configuration block diagram illustrating a part of an overall internal configuration of a base station (BS) in which the assignment of subchannels is performed during a downlink (DL) of an OFDMA system according to an embodiment of the present invention. An apparatus for assigning a subchannel according to the present invention is embodied through a subchannel assigning apparatus 30 included in the BS.

A signal transmitted from the BS illustrated in FIG. 3 passes through a frequency selective fading channel peculiar to each SS corresponding to the total number (K) of subscribers, and is then received by the SS of each subscriber. Referring to FIG. 3, the transmission rates required by users transmitted from SS of all subscribers and subchannel assignment information previously assigned to the respective SSs are input to the subchannel assigning apparatus 30 at each preset assignment period. The subchannel assigning apparatus 30 sequentially applies an assignment method according to the present invention at each assignment period utilizing the transmission rate required by each subscriber, and enables a first, second, and third assigning units 31, 32, and 33 to perform an adaptive assignment of subchannels and the assignment of bits.

Although not shown in FIG. 3, it would be recognized that the BS can be equipped with a receiving unit for receiving the transmission rate and subchannel assignment information required by each user (subscriber) and for providing the received required transmission rate and subchannel assignment information to the first, second, and third assigning units 31, 32, and 33. Since this can be implemented by using the widely known art, a detailed description need not be provided herein.

Furthermore, subscribers' data is assumed transmitted within the same cell that the transmission rate required by a subscriber, where the subscribers' data is classified non-real-time data when the transmission rate required by the subscriber has a value of '0' or a non-positive value and real-time data when the required transmission rate has the positive value.

An assignment method according to the present invention will be specifically described with reference to FIG. 4.

First, a description is made of fundamental conditions premised in the present invention in order to facilitate the understanding of the present invention. Assuming that there exists P antennas, N subchannels, and K users in an overall cell, the minimum data rate required for an SS according to each subscriber is represented as $R_{min}$, and the channel quality from an antenna p to an SS k in relation to a subchannel n is represented as $c_{k,n,p}$ expressed in terms of bits. For example, Qaudrature Phase Shift Keying (QPSK) coding having $R=2/3$ is used, $c_{k,n,p}$ equals $4/3$.

The small letter k is a parameter necessary to distinguish between users. N means the total number of subchannels. $c_{k,n}$ is the number of bits per symbol assigned to the nth subchannel of the kth user, and the number of bits per symbol $c_{k,n}$ is, for example, a positive real number. It is possible to assign a positive real number not a positive integer to the number of bits per symbol through a combination of modulation and an error control code.

Also, a symbol d refers to an adjacent antenna. For instance, if the antenna p is adjacent to an antenna q, $d_{p,q}$ is set to '1.' Otherwise $d_{p,q}$ is set to '0.'

The first stage, a second stage, a third stage and a fourth stage assignment algorithms may be expresses as mathematical expressions according to an embodiment of the present invention, as follows:.

---

$1^{ST}$ STAGE ASSIGNMENT ALGORITHM
$K_p = \phi, \forall p$
    For (k = 1 : K)

$$\left\{ \text{Calculate } c_{k,p} = \frac{1}{N}\sum_{n=1}^{N} c_{k,n,p}, \forall p \right. \rightarrow \text{MATH. EXPRESSION 1}$$

$$\text{Select } p' = \arg\max_{p} (c_{k,p}) \rightarrow \text{MATH. EXPRESSION 2}$$

$K_{p'} = K_{p'} \cup \{k\}$ ($K_p$ corresponds to a set of all users that the antenna p serves) end}

$2^{ND}$ STAGE ASSIGNMENT ALGORITHM
    For ( p = 1 : P )
        { $K_p = \{k_1, k_2, \ldots\}$ }

$$\text{Calculate } c_p = \frac{1}{N}\sum_{k=k_1}^{k_{|K_p|}} c_{k,p} \rightarrow \text{MATH. EXPRESSION 3}$$

end} if requeue is performed on P according to $c_p$, $c_1$ is greater than any other $c_p$.

$3^{RD}$ STAGE ASSIGNMENT ALGORITHM
$U = \{1, 2, 3, \ldots, N\}$
$\forall p, U_p = \phi, V_p = \phi$
(At the very beginning, all subchannels can be available.
    $U_p$ is a set of subchannels assigned to the antenna p, and
    $V_p$ is a set of subchannels used by antennas adjacent to the antenna p)

For ( p = 1 : P )
    { $K_p = \{k_1, k_2, \ldots\}$ }
    for q = 1 : p - 1
        if $d_{p,q} = 1$ then $V_p = V_p \cup U_q$
    end}
(searching for all subchannels that have already been used by adjacent antennas)
For k = 1 : |$K_p$|
    R = 0
    while R < $R_{min}$ $$\text{Select } n' = \arg\max_{n \in (U - V_p - U_p)} (c_{k,n,p}) \rightarrow \text{MATH. EXPRESSION 4}$$

-continued $$R = R + c_{k,n',p}$$

(subchannel n' is assigned to the antenna p and a user k)
$$U_p = U_p + \{n'\}$$

$4^{TH}$ STAGE ASSIGNMENT ALGORITHM
For ( p = 1 : P )
    $K_p = \{k_1, k_2, \ldots\}$
    if $\exists k \in K_p$ and to this k, R < $R_{min}$ then
        while R < $R_{min}$ $$\text{select } n' = \arg\max_{n \in (V_p - U_p)} (c_{k,n,p})$$

$$R = R + c_{k,n,p}$$
(subchannel n' is assigned to the antenna p and the user k)
$$U_p = U_p + \{n'\}$$

---

Figure 4:
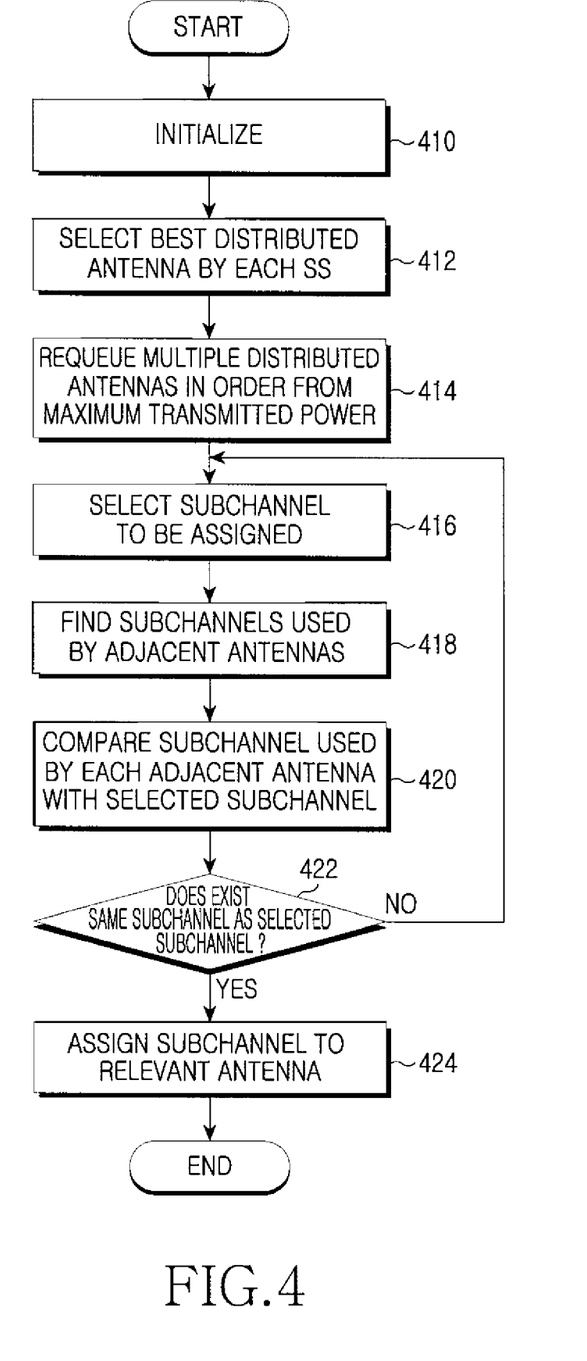
FIG. 4 is a flowchart illustrating a method for subchannel assignment for suppressing inter-antenna interference in an OFDMA system according to an embodiment of the present invention.

FIG. 4 is a flowchart illustrating a method for subchannel assignment for suppressing inter-antenna interference in an OFDMA system according to an embodiment of the present invention. With reference to FIG. 4, the BS receives the transmission rates requested by users from the corresponding SSs at each predetermined assignment period during an initialization operation in step 410. The data transmission rate $c_{k,p}$ required by an SS served by an arbitrary antenna p is calculated by using the above MATH. EXPRESSION 1.

In step 412, the best p, i.e., having the highest $c_{k,p}$, for an antenna is selected by using the above MATH. EXPRESSION 2.

To give high priority to an antenna p selected in step 412, re-queue is performed on multiple antennas by using the above MATH. EXPRESSION 3 in step 414.

In step 416, a subchannel to be assigned to a distributed antenna is selected in order from the relevant distributed antenna with top priority. At this time, subchannels employed by other distributed antennas adjacent to a neighboring area of the relevant distributed antenna are found in step 418. Herein, the number of other adjacent distributed antennas is at least one.

Then, respective subchannels used by adjacent distributed antennas are compared with the selected subchannel by using the above MATH. EXPRESSION 4 in step 420.

In a case where a subchannel is the same as a subchannel to be assigned to an adjacent antenna is found in step 422, i.e., if the selected subchannel has already been used by an adjacent antenna, the procedure returns back to step 416, and repeatedly performs the described steps 416, 418, 420, and 422 using the remaining subchannels. If the same subchannel is not found in step 422, an assignment of the subchannel is performed to the antenna in step 424.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

The merits and effects of exemplary embodiments, as disclosed in the present invention, and as so configured to operate above are described as follows.

According to the present invention, by assigning subchannels different from one another to antennas adjacent to one another, inter-antenna interference is minimized while satisfying the transmission rate required by a user.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for subchannel assignment in an Orthogonal Frequency Division Multiplexing Access (OFDMA) system-based distributed wireless communication system equipped with antennas that are geographically distributed in a coverage area and can simultaneously communicate with multiple Subscriber Stations (SSs), the method comprising:
(a) selecting and obtaining access to antennas that satisfy a data transmission rate that an SS requires and with which the SS can communicate;
(b) re-queuing an antenna that transmits maximum power to the SS within the coverage area as a high priority antenna; and
(c) assigning subchannels to the highest priority antenna, wherein the assigning of subchannels comprises the steps of
finding subchannels used by adjacent antennas to the high priority antenna, located in sub areas adjacent to a sub area in which the high priority antenna is centered; and
assigning, to the high priority antenna, subchannels excluding those used by the adjacent antennas, while assigning other subchannels to the high priority antenna even if the other subchannels are used by antennas in the coverage area located in sub areas that are non-adjacent to the sub area of the high priority antenna.

2. The method as claimed in claim 1, further comprising:
finding and assigning subchannels that are not used by the high priority antenna obtaining access to the SS when the data transmission rate required by the SS is not satisfied.

3. The method as claimed in claim 1, further comprising:
providing information on the usable subchannels back to a Base Station (BS).

4. An apparatus for subchannel assignment in an Orthogonal Frequency Division Multiplexing Access (OFDMA) system-based distributed wireless communication system having a plurality of distributed antennas for serving a coverage area and having a Base Station (BS) apparatus for subchannel assignment for controlling inter-antenna interference, the apparatus comprising:
  a first assigning unit for finding subchannels used by a distributed antennas in the coverage area; and
  a second assigning unit for specifying a distributed antenna that transmits maximum power to an SS as a high priority antenna, and assigning subchannels to the high priority antenna, wherein the assigning comprises assigning subchannels that are not the same as subchannels used by adjacent antennas located within sub areas adjacent to a sub area within which the high priority antenna is located, and assigning other subchannels to the high priority antenna for communication with the SS even if the other subchannels are in use by antennas in sub areas of the coverage area non-adjacent to the sub area of the high priority antenna.

5. The apparatus as claimed in claim 4, wherein the BS further comprises:
  a third assigning unit for finding and assigning subchannels that are not used by the relevant antenna obtaining access to the SS when the data transmission rate required by the SS is not satisfied.

6. An apparatus for subchannel assignment in an Orthogonal Frequency Division Multiplexing Access (OFDMA) system-based distributed wireless communication system equipped with antennas that are geographically distributed in a coverage area and can simultaneously communicate with multiple Subscriber Stations (SSs), comprising:
  a processor in communication with a memory, the memory including code providing instruction to said processor to execute:
  (a) selecting and obtaining access to antennas that satisfy a data transmission rate that an SS requires and with which the SS can communicate;
  (b) re-queuing an antenna that transmits maximum power to the SS within the coverage area as a high priority, antenna; and
  (c) assigning subchannels to the high priority antenna, wherein the assigning of subchannels comprises the steps of
    finding subchannels used by adjacent antennas to the high priority antenna, located in sub areas adjacent to a sub area in which the high priority antenna is centered; and
    assigning, to the high priority antenna, subchannels excluding those used by the adjacent antennas, while assigning other subchannels to the high priority antenna even if the other subchannels are used by antennas in the coverage area located in sub areas that are non-adjacent to the sub area of the high priority antenna.

7. The apparatus as claimed in claim 6, wherein the processor further executing code for:
  finding and assigning subchannels that are not used by the antenna obtaining access to the SS when the data transmission rate required by the SS is not satisfied.

8. The apparatus as claimed in claim 6, wherein the processor executing code for:
  receiving information on the usable subchannels.

9. A computer program stored in a tangible non-transitory computer readable medium causing a processor in an Orthogonal Frequency Division Multiplexing (OFDM) type wireless communications system to execute the steps of:

(a) selecting and obtaining access to antennas that satisfy a data transmission rate that an SS requires and with which the SS can communicate by determining:

$$c_{k,p} = \frac{1}{N} \sum_{n=1}^{N} c_{k,n,p}, \forall\, p;$$

wherein $c_{k,p}$ represents the number of bits per symbol;

$$p' = \underset{p}{\mathrm{argmax}}(c_{k,p})$$

wherein p represents an antenna;
(b) re-queuing an antenna that transmits maximum power to an SS within a coverage area as a high priority antenna, as:

$$p' = \underset{p}{\mathrm{argmax}}(c_{k,p})$$

wherein p represents an antenna; and $$c_p = \frac{1}{N} \sum_{k=k_1}^{k_{|K_p|}} c_{k,p}$$

(c) assigning subchannels to the highest priority antenna wherein the assigning comprises
  finding subchannels used by antennas located in adjacent sub areas to a sub area within which the high priority antenna is centered;
  assigning subchannels different from the found subchannels to the high priority antenna and expressed as;

$$n' = \underset{n \in (U - V_p - U_p)}{\mathrm{argmax}} (c_{k,n,p}),$$

where
  $U_p$ is a set of subchannels assigned to the antenna p, and
  $V_p$ is a set of subchannels used by antennas adjacent to the antenna p); and
  assigning other subchannels to the high priority antenna even if the other subchannels are used by antennas located in sub areas of the coverage area that are non-adjacent to the sub area of the high priority antenna.

10. The program as claimed in claim 9, wherein the processor further executing:
  finding and assigning subchannels that are not used by the antenna obtaining access to the SS when the data transmission rate required by the SS is not satisfied.

11. The program of claim 9, further comprising:
  receiving information on the usable subchannels.

12. A method for determining subchannels associated with each of a plurality of geographically distributed antennas in a coverage area of an Orthogonal Frequency Division Multiplexing type wireless communication system serving a plurality of Subscriber Stations (SSs), comprising:
- receiving information regarding each of the antennas for determining the data transmission rate required;
- designating an antenna transmitting maximum power to an SS as a high priority antenna;
- re-queuing each of the remaining antennas in an order with regard to the designated antenna;
- assigning subchannels to the high priority antenna by finding subchannels used by antennas located in adjacent sub area to a sub area within which the high priority antenna is centered and assigning subchannels to the high priority antenna excluding the found subchannels while assigning other subchannels to the high priority antenna even if the other subchannels are used by antennas in the coverage area located in sub areas that are non-adjacent to the sub area of the high priority antenna.

13. The method of claim 12, further comprising:
- finding and assigning subchannels that are not used by the antenna obtaining access to the SS when the data transmission rate required by the SS is not satisfied.

14. An apparatus for determining subchannels associated with each of a plurality of geographically distributed antennas in a coverage area of an Orthogonal Frequency Division Multiplexing type wireless communication system serving a plurality of Subscriber Stations (SSs), comprising:
- a processor in communication with a memory, the memory containing code which when accessed by the processor causes the processor to execute the steps of:
  - receiving information regarding each of the antennas for determining the data transmission rate required;
  - designating an antenna transmitting maximum power to an SS as a high priority antenna;
  - re-queuing each of the remaining antennas in an order with regard to the designated antenna;
  - assigning subchannels to the high priority antennas by finding subchannels used by antennas located in adjacent sub areas to a sub area within which the high priority antenna is centered and assigning subchannels to the high priority antenna excluding the found subchannels while assigning other subchannels to the high priority antenna even if the other subchannels are used by antennas in the coverage area located in sub areas that are non-adjacent to the sub area of the high priority antenna.

15. The apparatus of claim 14, wherein the processor further execute code for:
- finding and assigning subchannels that are not used by the antenna obtaining access to the SS when the data transmission rate required by the SS is not satisfied.

* * * * *

UNITED STATES PATENT AND TRADEMARK OFFICE
CERTIFICATE OF CORRECTION

| | | |
|---|---|---|
| PATENT NO. | : 8,149,933 B2 | Page 1 of 1 |
| APPLICATION NO. | : 12/040023 | |
| DATED | : April 3, 2012 | |
| INVENTOR(S) | : Shuangfeng Han et al. | |

It is certified that error appears in the above-identified patent and that said Letters Patent is hereby corrected as shown below:

Column 9, Claim 4, Lines 6-7 should read as follows:
--...subchannels used by distributed antennas...--

Column 11, Claim 12, Line 11 should read as follows:
--...sub areas to a sub area within...--

Signed and Sealed this
Thirtieth Day of October, 2012

David J. Kappos
*Director of the United States Patent and Trademark Office*